United States Patent [19]

Pinckney

[11] Patent Number: 4,687,750

[45] Date of Patent: Aug. 18, 1987

[54] TRANSPARENT GLASS-CERAMICS CONTAINING GAHNITE

[75] Inventor: Linda R. Pinckney, Corning, N.Y.

[73] Assignee: Corning Glass Works, Corning, N.Y.

[21] Appl. No.: 904,286

[22] Filed: Sep. 8, 1986

[51] Int. Cl.$^4$ ............... C03C 10/02; C03C 3/085
[52] U.S. Cl. ........................... 501/10; 501/69
[58] Field of Search ......................... 501/10, 69

[56] References Cited

U.S. PATENT DOCUMENTS

| | | | |
|---|---|---|---|
| 2,920,971 | 1/1960 | Stookey | 501/10 |
| 3,460,987 | 8/1969 | McMillan et al. | 501/70 |
| 3,681,097 | 8/1972 | Beall et al. | 501/4 |
| 3,681,102 | 8/1972 | Beall | 501/69 |
| 3,839,053 | 10/1974 | Rittler | 501/4 |
| 3,854,963 | 12/1974 | Rittler | 501/4 |
| 3,951,669 | 4/1976 | Malmendier et al. | 501/4 |
| 4,199,340 | 4/1980 | Topping et al. | 65/33 |
| 4,526,873 | 7/1985 | Beall et al. | 501/5 |

*Primary Examiner*—Mark L. Bell
*Attorney, Agent, or Firm*—C. S. Janes, Jr.

[57] ABSTRACT

This invention relates to the production of highly transparent glass-ceramic articles containing about 30–50% by volume gahnite having dimensions finer than about 300 Å as essentially the sole crystal phase. The articles have compositions essentially free of $Li_2O$, $Na_2O$, CaO, SrO, and BaO and consist essentially, by weight, of about 1.5–5% $R_2O$, consisting of 0–3% $K_2O$ and/or 0–3% $Rb_2O$ and/or 0–3% $Cs_2O$, 13–22% ZnO, 16–28% $Al_2O_3$, 45–65% $SiO_2$, and 1.5–8% $TiO_2$.

2 Claims, No Drawings

TRANSPARENT GLASS-CERAMICS CONTAINING GAHNITE

BACKGROUND OF THE INVENTION

U.S. Pat. No. 3,681,102 disclosed the production of transparent glass-ceramic articles wherein the zinc spinel gahnite ($ZnO.Al_2O_3$) constituted the predominant crystal phase. That patent described the preparation of such articles as involving three general steps: first, a glass forming batch consisting essentially, expressed in terms of weight percent on the oxide basis, of about 2-20% ZnO, 8-25% $Al_2O_3$, 55-75% $SiO_2$, and 2-12% $ZrO_2$ as the nucleating agent was melted at 1650°-1800° C; second, that melt was cooled to a temperature below the transformation range thereof and simultaneously a glass body of a desired configuration was shaped therefrom; and, third, that glass body was exposed to a temperature between about 975°-1250° C. for a sufficient length of time to cause the development of nuclei and the subsequent growth of gahnite crystals on those nuclei. (The transformation range has been defined as the temperature at which a liquid melt is deemed to have become a vitreous solid, that temperature generally being considered as residing in the vicinity of the annealing point of the glass.)

The crystals were described as having diameters less than 1000Å and as comprising between 20-50% by weight of the articles; the residual glassy matrix having a highly siliceous content. The final products were stated to exhibit linear coefficients of thermal expansion (25°-300° C.) ranging between about $25-40 \times 10^{-7}/°$ C., and to maintain their transparency for extended periods of exposure at temperatures up to 1000° C. and for brief intervals at 1200° C.

The patent also disclosed the incorporation of 0.01-1.0% $Cr_2O_3$ into the base compositions to produce $Cr_2O_3$-doped gahnite crystals, thereby imparting red photoluminescence to the glass-ceramics. The inclusion of $Cr_2O_3$ did not adversely affect the transparency or other physical properties of the products.

As optional additional ingredients, the patent observed the use of up to 5% MgO, up to 10% total of BaO, CaO, SrO, $K_2O$, $Rb_2O$, and $Cs_2O$, and up to 5% total of $Li_2O$, $Na_2O$, $B_2O_3$, and $TiO_2$. The working examples, however, contained only MgO as an optional addition.

SUMMARY OF THE INVENTION

The present invention had its basis in U.S. Pat. No. 3,681,102 and is an improvement upon the products of that disclosure. Thus, the present invention is founded in the discovery that transparent glass-ceramic articles containing gahnite as the predominant crystal phase, but exhibiting much improved physical properties, can be prepared from a narrow range of compositions within the $R_2O$-ZnO-$Al_2O_3$-$SiO_2$ system, wherein $R_2O$ consists of $K_2O$ and/or $Rb_2O$ and/or $Cs_2O$, which are nucleated with $TiO_2$. To illustrate:

The precursor glass forming batches for the present glass-ceramics can be melted at lower temperatures, viz., about 1600° C. Such lower melting temperatures provide two significant advantages. First, conventional, large scale commercial glass melting tanks may be employed. Second, the energy cost for melting the batch is significantly reduced.

The instant glass-ceramics also demonstrate greater refractoriness, as is evidenced by their retention of transparency after extended periods of exposure to temperatures up to 1100° C. That increased refractoriness is believed to be due to two factors: first, the crystal content developed in the inventive glass-ceramics can exceed 50%, with a consequent decrease in the proportion of residual glassy phase; and, second, the crystals are exceedingly small, with diameters of less than about 300Å, normally only about 100-200Å, such that grain growth of those crystals must be quite considerable before haze resulting from light diffusion becomes substantial.

The increased crystal content can also give rise to bodies exhibiting improved flexural strength.

Also, in like manner to the products of U.S. Pat. No. 3,681,102, the compositions of the present invention can be doped with $Cr_2O_3$ to yield glass-ceramics which absorb ultraviolet radiation and fluoresce in the red and near infrared regions of the spectrum. Such capability has suggested applications for the inventive glass-ceramics in tunable lasers and in solar collectors.

Because of the high efficiency of $TiO_2$ as a nucleating agent, compositions operable for preparing glass-ceramic bodies containing gahnite as virtually the sole crystal phase and exhibiting the transparency and the physical properties desired in the inventive products must be essentially free of $Li_2O$, $Na_2O$, CaO, SrO, and BaO in order to avoid the development of other crystal phases during heat treatment of the precursor glass body. With care, minor amounts of MgO, perhaps up to 2% by weight, may be included to enter the gahnite crystal structure so as to produce a zinc spinel solid solution (ZnO, MgO). $Al_2O_3$ comprising up to 20 mole percent MgO, while still maintaining transparency in the crystallized bodies. Nevertheless, the inclusion of MgO does not appear to improve the physical properties demonstrated by the glass-ceramics, and its presence hazards the development of such unwanted silicate phases as $\frac{7}{8}$-quartz solid solutions which impair transparency. Therefore, its essential absence is generally preferred.

In summary, compositions operable in the present invention to produce transparent glass-ceramic articles containing gahnite as essentially the sole crystal phase consist essentially, expressed in terms of weight percent on the oxide basis, of about 1.5-5% $R_2O$, consisting of 0-3% $K_2O$ + 0-3% $Rb_2O$ + 0-3% $Cs_2O$, 13-22% ZnO, 16-28% $Al_2O_3$, 45-65% $SiO_2$, and 1.5-8% $TiO_2$ as the nucleating agent. The presence of $K_2O$ and/or $Rb_2O$ and/or $Cs_2O$ is essential to obtaining transparency in the crystalline body. The use of $Rb_2O$ and/or $Cs_2O$ instead of $K_2O$ yields products demonstrating better electrical properties, since their larger ionic size more effectively inhibits their migration through the residual glass. Minor amounts of $ZrO_2$ may be included in the compositions without adversely affecting the properties of the crystallized products. Nonetheless, its inclusion is unnecessary as a nucleating agent inasmuch as $TiO_2$ is a much more efficient agent. Moreover, $ZrO_2$ is much less soluble than $TiO_2$ in the glass melt; hence, its presence hazards unmelted particles and/or devitrification in the glass and requires higher melting temperatures. Finally, $ZrO_2$ frequently contains trace amounts of the radioactive element thorium. The presence of that element limits the applications in which the products can be employed. The inventive glass-ceramics can be greater than 50% by volume crystalline and exhibit linear coefficients of thermal expansion (0°-300° C.)

between about 30–50×10⁻⁷/° C. Such a range of thermal expansion enables products to be prepared which match the thermal expansion of silicon, thereby recommending their utility as a substrate for the active matrix in liquid crystal displays and for integrated circuit packaging.

The inventive articles are produced in accordance with the following three general steps: (1) a glass forming batch for a glass having a composition within the above-cited ranges of components is melted; (2) that melt is cooled to a temperature at least below the transformation range thereof and simultaneously a glass article of a desired configuration is shaped therefrom; and (3) that glass article is exposed to a temperature within the interval of 900°–1100° C. for a period of time sufficient to cause the growth of gahnite crystals in situ. To insure the development of very fine-grained crystals of uniform dimensions, i.e., having diameters of less than 300Å, a two-stage heat treatment of the glass article may be employed. Such practice contemplates initially subjecting the glass article to a temperature within or slightly above the transformation range (about 775°–825° C.) for a sufficient period of time to generate a myriad of nuclei therein. The nucleated article is then heated to 900°–1100° C. to grow gahnite crystals on the nuclei. Hence, the combination of a nucleation period of about 1–8 hours followed by a crystallization period of about 2–8 hours has yielded articles exhibiting very fine-grained crystals of highly uniform dimensions. Such articles can demonstrate haze-free transparency.

The preferred base compositions will contain at least 2.5% $R_2O$, at least 14% ZnO, at least 18% $Al_2O_3$, less than 60% $SiO_2$, at least 2.5% $TiO_2$, and be essentially free from MgO.

PRIOR ART

U.S. Pat. No. 3,460,987 discloses the fabrication of composite articles consisting of a ceramic-carbon body coated with a glass-ceramic, said glass-ceramic coating consisting, by weight, of $SiO_2$: 16–32
$Al_2O_3$: 12–16
ZnO: 43–47
$B_2O_3$: 10–25
$Li_2O$: 0–6
$Na_2O$: 0–6
$K_2O$: 0–6
MgO: 0–10
CaO: 0–10
SrO: 0–10
BaO: 0–10

The identity of the crystal phase(s) present is not provided, but the composition intervals are self-evidently remote from those of the present inventive glass-ceramics. No mention is made of transparency.

U.S. Pat. No. 3,681,097 describes the preparat of glass-ceramic articles containing zinc petalite solid solution or β-quartz solid solution as the predominant crystal phase. Operable compositions therefor are essentially free of alkali metal oxides and MgO, CaO, and SrO, and consist essentially, by weight, of 13–40% ZnO, 9–26% $Al_2O_3$, 40–75% $SiO_2$, and 3–10% $ZrO_2$. Up to 6% BaO may advantageously be present. Up to 2% $TiO_2$ may be tolerated, but its inclusion hazards the growth of gahnite which is expressly stated to be unwanted. No mention is made of transparency.

U.S. Pat. No. 3,839,053 is directed to highly opaque glass-ceramic articles containing zinc petalite solid solution or β-quartz solid solution consisting essentially, by weight, of about 10–20% ZnO, 12–20% $Al_2O_3$, 1–10% $Ta_2O_5$, 50–65% $SiO_2$, and 2–8% $ZrO_2$. The inclusion of $TiO_2$ is cautioned against as tending to lead to the development of gahnite, an unwanted crystal phase.

U.S. Pat. No. 3,854,963 is drawn to densely opaque glass-ceramic articles containing zinc petalite solid solution or β-quartz solid solution consisting essentially, by weight, or about 10–20% ZnO, 10–20% $Al_2O_3$, 50–75% $SiO_2$, and at least 0.1% AgCl. The inclusion of $TiO_2$ is discouraged as resulting in the formation of gahnite, an unwanted crystal phase.

U.S. Pat. No. 3,951,669 is concerned with the use of a glass-ceramic containing zinc β-quartz solid solution as the predominant crystal phase as a filler in a solder sealing glass. No nucleating agent as such was utilized; the precursor glass was powdered and nucleation was derived from the surfaces of the fine particles during firing thereof. The glass-ceramics consisted essentially, in weight percent, of 45–65% $SiO_2$ and at least 35% ZnO+$Al_2O_3$, wherein ZnO and $Al_2O_3$ are present in molar ratios ranging between 0.9–1.1. The presence of zinc spinel is explicitly warned against. No mention is made of transparency.

U.S. Pat. No. 4,199,340 relates to glass-ceramics useful in glass-ceramic-to-metal seals, the glass-ceramics consisting essentially, by weight, of 25–32% ZnO, 2.5–10% $Al_2O_3$, and 30–60% $SiO_2$. $ZrO_2$ in amounts up to 12.5% is cited as one of several operable nucleating agents. No identification of crystal phase(s) present is provided. $TiO_2$ is nowhere referred to and transparency is not mentioned.

U.S. Pat. No. 4,526,873 presents transparent glass-ceramic articles containing mullite as the primary crystal phase consisting essentially, by weight, of 10–70% $SiO_2$, 7–40% $B_2O_3$, 14–50% $Al_2O_3$, 2–15% ZnO, 0–35% RO, wherein RO consists of 0–15% MgO, 0–20% CaO, 0–30% SrO, 0–30% BaO, and 0–30% PbO, and 0–30% $R_2O$, wherein $R_2O$ consists of 0–10% $Li_2O$, 0–15% $Na_2O$, 0–25% $K_2O$, 0–30% $Rb_2O$, and 0–30% $Cs_2O$, and wherein the mole ratio $Al_2O_3$:RO+$R_2O$>1.3. The inclusion of 0.01–1% $Cr_2O_3$ provides a body which absorbs strongly in the 400–600 nm wavelength region of the radiation spectrum and fluoresces strongly in the red and near infrared portions of the spectrum when activated by ultraviolet and/or visible light.

DESCRIPTION OF PREFERRED EMBODIMENTS

Table I records a number of parent glass compositions prepared in the laboratory, expressed in terms of parts by weight on the oxide basis, illustrating the parameters of the present invention. Because the sum of the individual components totals or closely approximates 100, for all practical purposes the tabulated values can be deemed to reflect weight percent. The actual batch ingredients may comprise any materials, either oxides or other compounds, which, when melted together, will be converted into the desired oxide in the proper proportions.

The constituents for each of the reported glasses were compounded, ballmilled together to aid in obtaining a homogeneous melt, and then charged into platinum crucibles. After placing lids thereon, the crucibles were introduced into a furnace operating at about 1600° the batches melted for 16 hours. The melts were poured into steel molds to form glass slabs having dimensions of about 6"×6"×0.5" and those slabs were immediately transferred to an annealer operating at about 750° C.

Whereas the above description reflects laboratory glassmaking, it will be appreciated that the recited compositions could be melted in large scale, commercial glassmaking facilities. To improve glass quality, a fining agent such as $As_2O_3$ and/or $Sb_2O_3$ may be added to the batch. The amount remaining in the glass after the batch is melted is too small to substantively affect the character and properties of the glass.

TABLE I

|  | 1 | 2 | 3 | 4 | 5 | 6 |
|---|---|---|---|---|---|---|
| $SiO_2$ | 61.1 | 59.9 | 50.6 | 46.0 | 49.4 | 50.9 |
| $Al_2O_3$ | 18.2 | 17.9 | 23.0 | 25.0 | 22.4 | 23.2 |
| ZnO | 14.6 | 14.3 | 18.4 | 20.5 | 18.0 | 18.5 |
| $TiO_2$ | 3.0 | 5.0 | 5.0 | 5.0 | 3.6 | 5.0 |
| $Rb_2O$ | 1.5 | 1.5 | 1.5 | 1.5 | 1.5 | — |
| $Cs_2O$ | 1.5 | 1.5 | 1.5 | 1.5 | 1.5 | — |
| $K_2O$ | — | — | — | — | — | 2.4 |
| $ZrO_2$ | — | — | — | — | 3.6 | — |

Specimens having the proper dimensions for use in the tests referred to below were cut from the glass slabs and introduced into an electrically-heated furnace. The furnace was heated at a rate of 300° C./hour to 800° C., maintained at that temperature for two hours to promote good nucleation and then again raised at a rate of 300° C./hour to 1000° C. and held at that temperature for four hours to insure extensive crystallization. Such rate was merely a matter of convenience. More rapid or slower increases are possible; however, too fast a rate may lead to thermal deformation or even breakage of the precursor glass body. The crystallized articles were cooled to room temperature by merely cutting off the electric current to the furnace and allowing the furnace to cool with the articles therewithin. The practice is, again, simply a matter of convenience and is referred to as "cooling at furnace rate"; the rate averages about 3°-5° C./minute.

Table II reports a visual description of the crystallized samples, and values of linear coefficient of thermal expansion over the range 0°–300° C. (Coef.Exp.), expressed in terms of $\times 10^{-7}/°$ C., electrical resistivity (Log P) at 500° C., dielectric constant (D.C.) from room temperature to 300° C. at 100 KHz, and dissipation factor (D.F.) over the range of 100°–200° C. at 100 KHz where determined, utilizing measuring techniques conventional in the art. In all samples gahnite constituted essentially the sole crystal phase.

TABLE II

| Example | Visual Description | Coef. Exp. | Log ρ | D.C. | D.F. |
|---|---|---|---|---|---|
| 1 | Gray, transparent | 34 | — | — | — |
| 2 | Gray, transparent | 33 | 7.90 | 6.0 | 0.007 |
| 3 | Gray, transparent | 41 | 7.91 | 6.6 | 0.007 |
| 4 | Gray, transparent slight haze | 44 | 7.93 | 6.7 | 0.007 |
| 5 | Dark red-to-violet, transparent | 50 | 7.95 | 6.75 | 0.005 |
| 6 | Gray, transparent | — | — | — | — |

Example 3 appears to constitute an optimum compromise of glass melting and forming characteristics along with desirable physical properties in the final glass-ceramic. Accordingly, the most preferred compositions will contain less than 55% $SiO_2$ and at least 20% $Al_2O_3$.

I claim:

1. A highly transparent glass-ceramic article essentially free of $Li_2O$, $Na_2O$, CaO, SrO, and BaO, wherein gahnite having dimensions finer than about 300Å constitutes essentially the sole crystal phase, the composition of said article consisting essentially, expressed in terms of weight percent on the oxide basis, of about 1.5–5% $R_2O$, consisting of 0–3% $K_2O$ and/or 0–3% $Rb_2O$ and/or 0–3% $Cs_2O$, 13–22% ZnO, 16–28% $Al_2O_3$, 45–65% $SiO_2$, and 1.5–8% $TiO_2$.

2. A glass-ceramic article according to claim 1 wherein the composition of said article contains at least 2.5% $R_2O$, at least 14% ZnO, at least 18% $Al_2O_3$, less than 60% $SiO_2$, at least 2.5% $TiO_2$, and is essentially free from MgO.

* * * * *